United States Patent
Uppal et al.

(10) Patent No.: US 7,043,228 B2
(45) Date of Patent: May 9, 2006

(54) METHOD AND SYSTEM FOR BILLING A CALL THAT IS FORWARDED TO A PREPAID SUBSCRIBER'S VOICEMAIL

(75) Inventors: Sukhwinder Uppal, Plano, TX (US); Jorgen Sandegard, Richardson, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 955 days.

(21) Appl. No.: 10/033,844

(22) Filed: Dec. 27, 2001

(65) Prior Publication Data

US 2003/0119477 A1    Jun. 26, 2003

(51) Int. Cl.
*H04M 11/00* (2006.01)
*H04M 15/00* (2006.01)

(52) U.S. Cl. .................... 455/406; 379/114.2
(58) Field of Classification Search ........... 455/413, 455/412.2, 415, 417; 379/67.1, 88.04, 88.12, 379/88.16, 88.18, 88.19, 88.2, 88.22, 114.2, 379/211.02

See application file for complete search history.

(56) References Cited

U.S. PATENT DOCUMENTS 6,356,630 B1 *   3/2002   Cai et al. ............. 379/144.01
6,694,003 B1 *   2/2004   Karam .................. 379/211.02
6,871,062 B1 *   3/2005   Trop et al. ............... 455/406
2003/0012345 A1 *  1/2003   Marsh et al. ............ 379/67.1

FOREIGN PATENT DOCUMENTS

WO    WO 98/56160      12/1998
WO    WO 99 31916 A    6/1999

OTHER PUBLICATIONS

Black et al: "The intelligent network", The Intelligent Network. Customizing Telecommunication Networks and Services, Advanced Communications Technologies, Upper Saddle River, NJ: Prentice Hall, US XP002141946 ISBN: 0-13-793019-4 the whole document.

* cited by examiner

*Primary Examiner*—Rexford Barnie

(57) ABSTRACT

A method and system to provide a voice mail service for a prepaid subscriber in a wireless telecommunication system is described wherein a prepaid administrative system is connected with a switching node. When the switching node receives an incoming call to the prepaid subscriber and the subscriber's number is busy or unavailable, the call is redirected to a voice mail number. The system determines whether the incoming call to the voice mail originates from the prepaid subscriber, i.e., the subscriber is checking for voice messages. If the call originates from the subscriber's wireless phone number, the call is charged to the subscriber's account. If the call originates from other than the subscriber's wireless phone, there are no charges to the account.

21 Claims, 4 Drawing Sheets

METHOD AND SYSTEM FOR BILLING A CALL THAT IS FORWARDED TO A PREPAID SUBSCRIBER'S VOICEMAIL

TECHNICAL FIELD

This invention is related in general to the field of telecommunications. The invention is related in particular to a prepaid billing architecture for a wireless telecommunication system. Even more particularly, the invention is related to subscriber voicemail in a wireless telecommunication system.

BACKGROUND OF THE INVENTION

Cellular or wireless telecommunication systems have recently introduced a prepayment architecture that allows a subscriber to prepay for services. An advantage services for the wireless operator with prepaid is that the operator obtains payment in advance saving costly collection services or having to obtain security such as credit card information from a subscriber. The subscriber pays as he uses the system avoiding basic monthly service charges when usage is low.

The current prepaid architecture, in use in many cellular wireless telecommunication systems stores a pre-payment made by a subscriber in a prepaid administration server (PPAS) as a time duration value. In other words, the funds are correlated to specific amounts of time that correspond to rates available to the subscriber, i.e., long distance, local, international, etc. When a prepaid subscriber initiates a call, a switching node of the wireless telecommunication system obtains the credit balance of the subscriber from the stored credit balance as a time interval value. The switching node determines the service charging rate for the call depending on the service the subscriber is requesting and applies this charging rate as a timer decrement. That is, the timer is set at the current credit balance and the balance is decreased at a rate corresponding to the service requested each time that the subscriber uses the service. The caller continues to use the prepaid wireless service up to the amount of funds available in the account. When the timer reaches zero time, representing a nil credit balance, then the call is cleared or ended by the switching node. When the account becomes depleted of funds, additional deposits may be made to replenish the account balance.

There are however, several disadvantages associated with traditional prepaid wireless accounts. First, the caller may be required to enter an additional authorization code or personal identification number (PIN) in order to place each call. Another disadvantage to the traditional system is that the subscriber incurs charges when an incoming call is diverted to the subscriber's associated voice mail number. The subscriber is then charged twice for the same call—as the call is received into voice mail and when the subscriber retrieves the message.

It would be desirable therefore to provide an option in a prepaid system that allows a subscriber to receive a voice mail without charge.

SUMMARY OF THE INVENTION

It is an object of the invention to provide a method and system that allows a prepaid subscriber to receive a voice mail without charge.

To address the above-discussed deficiencies of the prior art, the present invention provides, for use in a telecommunications network, a voice mail service for a prepaid subscriber, wherein a prepaid administrative system, is connected to a switching node. When the switching node receives an incoming call to the prepaid subscriber and the subscriber's number is busy or unavailable, the call is redirected to a voice mail number. The system determines whether the incoming call originates from the prepaid subscriber, i.e., the subscriber is checking for voice messages. If the call originates from the subscriber, the call is charged to the subscriber's account. Incoming calls to a prepaid subscriber that are redirected to a voice mail account are not charged to the subscriber's account. However, there are charges if the subscriber retrieves the mail from the subscriber's wireless phone number.

In one embodiment of the present invention, a trigger attached to the incoming call is detected and the number and association of identifiers that are present in the trigger are determined.

In another embodiment of the present invention, after detecting the identifiers included in the trigger, the identifiers are checked to determine if at least one identifier is a called party number (CPN) associated with the prepaid subscriber and whether the CPN matches the subscribers voice mail destination number.

In a further embodiment of the present invention, a redirecting party identifier (RPId), if present in the trigger, is compared to the CPN. If the RPI is identical to the CPN, an indicator in a message is set to "charge." If the RPId does not match the CPN, the indicator is set to "no charge."

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention including its features and advantages, reference is made to the following detailed description of the invention, taken in conjunction with accompanying drawings of which.

DETAILED DESCRIPTION OF THE INVENTION

In the following description, for purposes of explanation and not limitation, specific details are set forth, such as particular architectures, interfaces, circuits, logic modules (implemented in, for example, software, hardware, firmware, some combination thereof, etc.), techniques, etc. in order to provide a thorough understanding of the invention. However, it will be apparent to one of ordinary skill in the art that the present invention may be practiced in other embodiments that depart from these specific details. In other instances, detailed descriptions of well-known methods, devices, logic code (e.g., hardware, software, firmware, etc.), etc., are omitted so as not to obscure the description of the present invention with unnecessary detail.

Figure 1:
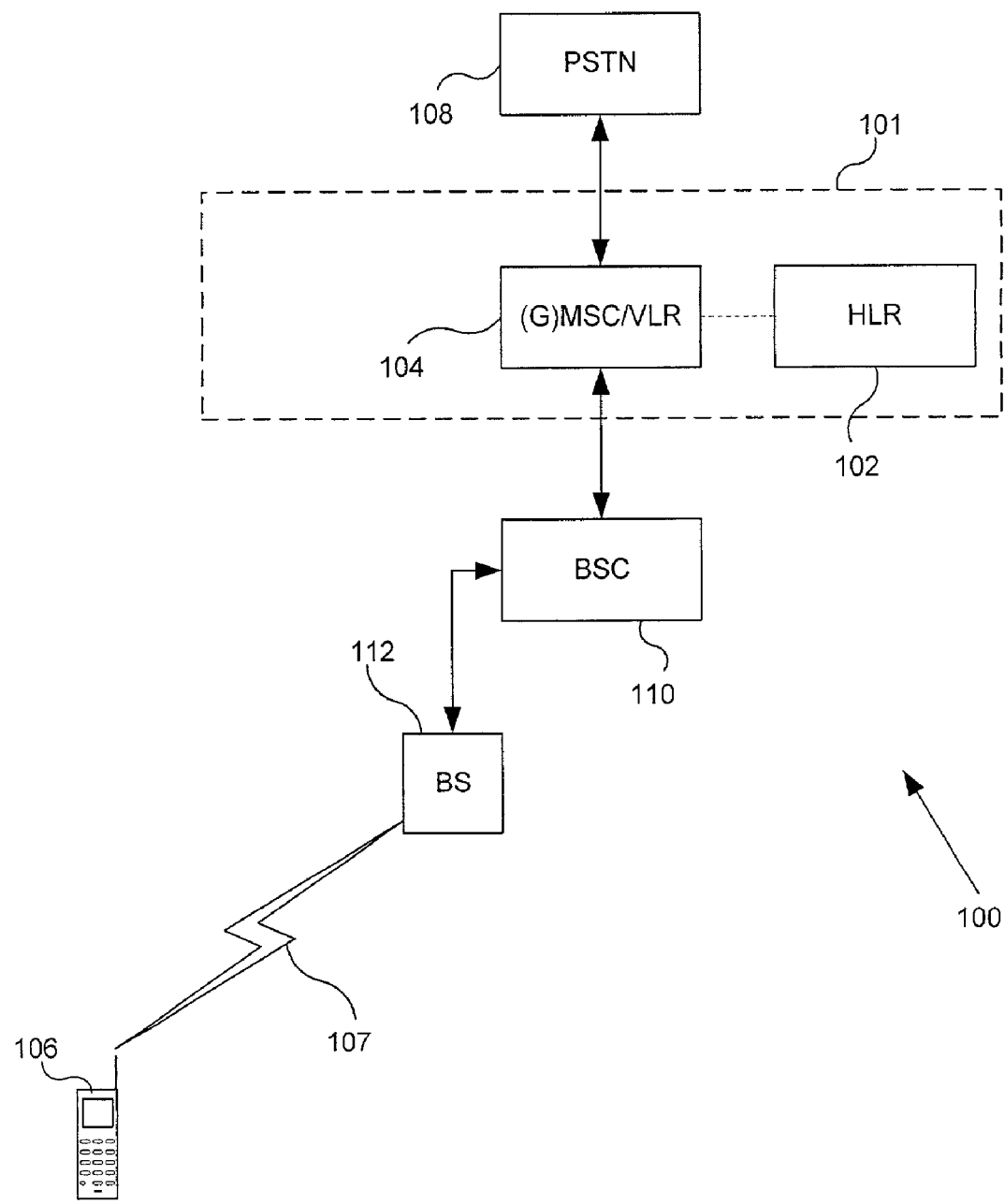
FIG. 1 a high-level block diagram of a portion of a communications system.

A preferred embodiment of the present invention and its advantages are best understood by referring to FIGS. 1–5 of the drawings, like numerals being used for like and corresponding parts of the various drawings. With reference now to the figures, FIG. 1 illustrates a high-level block diagram of a portion of a communications system. Included in communications system 100, is fixed network (PSTN) 108, switching system (SS) 101, Base Station Controller (BSC) 110, and Base Station (BS) 112.

SS 101 includes a plurality of interconnected switching nodes commonly referred to as mobile switching centers (MSCs). Although only MSC 104 is shown, it will be understood that system 101 likely includes many more interconnected nodes. MSC 104 may comprise any one of a number of known telecommunications switching devices, including those commonly used and known in the art for providing either digital or analog cellular telephone service to a plurality of mobile stations (MS) 106. Further, as shown, MSC 104 is shown as including the visitor location register (VLR) which is a data base containing information about all the MSs currently located in the MSC area. The gateway (G) designation shown in MSC 104 indicates that a call that is directed to MS 106, is received from PSTN 108 and designates MSC 104 as a gateway MSC. (G)MSC determines the location of MSC 106 and routes the call to the correct MSC. This grouping of functions, shown in FIG. 1 as (G)MSC/VLR 104 will be referred to hereinafter as MSC 104.

Voice trunks (not shown) provide voice and data communications paths used to carry subscriber communications between mobile switching centers. Signaling links (not shown) carry command signals, such as IS-41 or other Signaling System 7 (SS7) messages between MSCs. These signals may be used, for example, in setting up and tearing down voice and data communications links and controlling the provision of calling services to MS 106.

MSC 104 is also connected to home location register (HLR) 102, comprising a database (not shown). The database in HLR 102 stores subscriber information concerning MS 106 such as supplementary services and authentication parameters. Furthermore, there will be information about the location of MS 106. This information, provided by MS 106 via MSC to HLR 102, changes as MS 106 moves around, thus providing means to receive a call at MS 106.

MSC 104 is further connected to at least one associated base station controller (BSC) 110. Only one base station controller is shown connected to MSC 104 in order to simplify the illustration. BSC 110 is then connected to a plurality of base stations (BS) 112 (only one is shown) which operate to effectuate radio frequency communications with proximately located MS 106 over air interface 107. Base station controller 110 functions in a well-known manner to control this radio frequency communications operation.

Although direct communications links (signaling and/or trunk) are illustrated for system 100 of FIG. 1, it is understood by those skilled in the art that the links are not necessarily direct between the illustrated nodes. The communications may instead pass through many other communications nodes (not shown) of the mobile network, and perhaps even utilize other communications networks (such as the public switched telephone network-PSTN). Illustration of the links in the manner shown in FIG. 1 is therefore by way of simplification of the drawing.

Though not shown, a prepaid system may be included in communication system 100. The prepaid system may include an Internet Protocol (IP) communication or signaling link connected to MSC 104. The signaling link carries real-time call event messages across the IP links using Transmission Control Protocol (TCP). Real-time call event messaging may be utilized by the prepaid administrative system to adjust charges on calls made by the prepaid subscriber.

Figure 2:
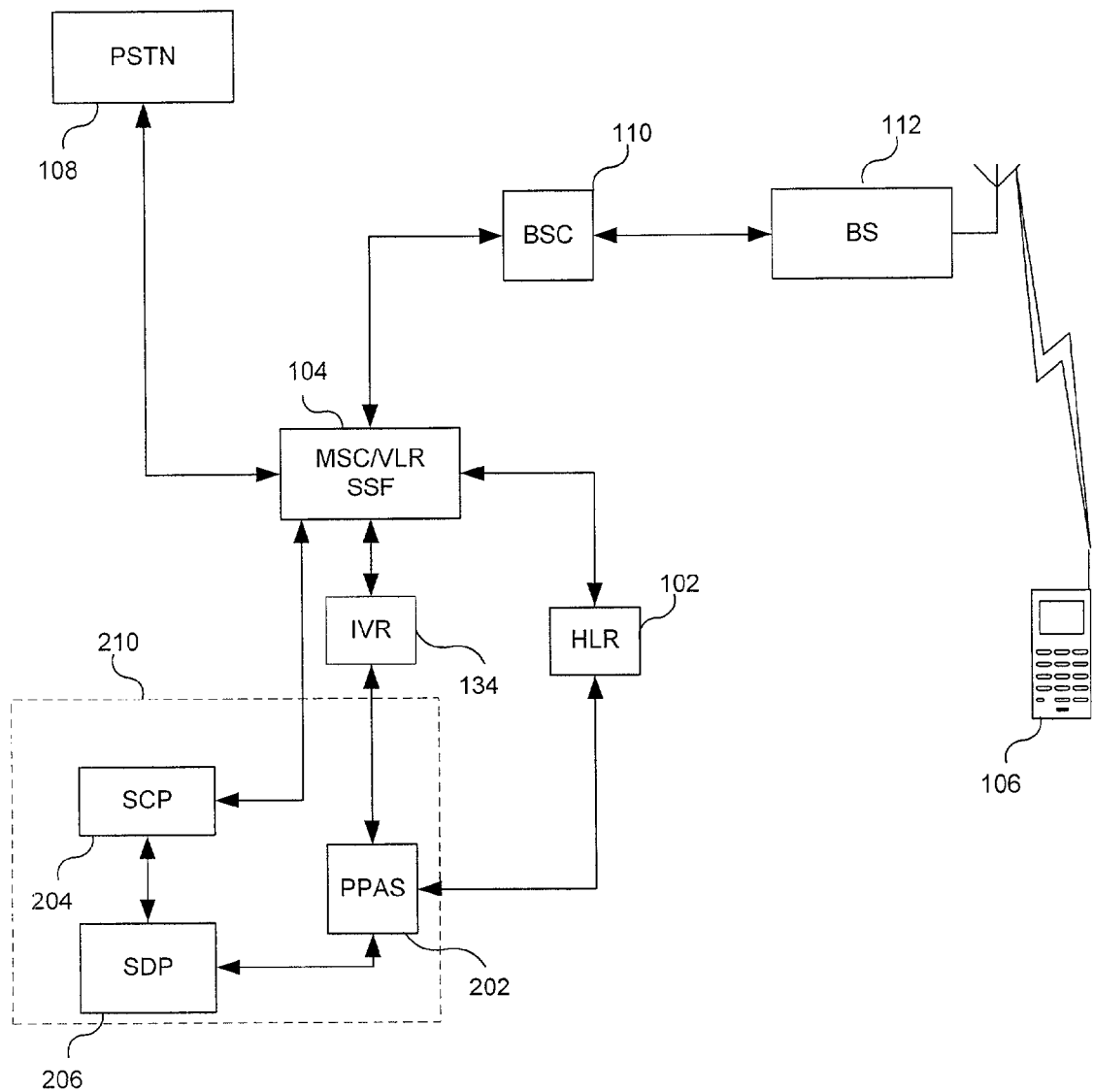
FIG. 2 illustrates an exemplary high-level block diagram of a prepaid service for a wireless network, according to an embodiment of the present invention.

FIG. 2 illustrates an exemplary high-level block diagram of a prepaid service for a wireless network, according to an embodiment of the present invention. MS 106 may be in communication with BS 112 via air interface 107. BS 112 provides a communication link with MSC 104 via BSC 110. Calls made to MS 106 (i.e., calls from PSTN 108) may also be routed via MSC 104. All prepaid service (PPS) calls, to or from MS 106, are routed by MSC 104 to service switching function (SSF) 208. Interactive voice response (IVR) 201 is used to guide a PPS subscriber (hereinafter, referred to as MS 106) that has called the service provider's service number. By giving announcements and voice prompts to the subscriber and receiving DTMF in response, IVR 201 helps the caller to interact with PPAS 202 with account balance inquiries, expiration date inquiries and refill procedures.

SSF 208 may be integrated in MSC 104 and is capable of handling service execution in service control point (SCP) 204. SSF 208 initiates service execution in SCP 204. SCP 204 directs SSF 208 on how to handle the call. SSF 208, among other duties in the prepaid system, reports call duration, supervises calls and receives announcement codes from Service Data Point (SDP) 206.

A Service Control Function (SCF)(not shown) executes an Intelligent Network (IN) application located in SCP 204. Utilizing the IN application, SCP 204 interacts with SDP 206 to retrieve data necessary for a PPS call and sends operations to SDP 206 for updating data and for statistical purposes. SCP 204 controls the call by interacting with SSF 208. SCP 204 interrogates, monitors and generates Call Detail Records (CDRs) for each call.

SSF 208 triggers SCP 204 to execute the prepaid service routine upon detecting a prepaid call, either incoming or outgoing. SDP 206 rates calls by applying rate charging analysis and also reserves funds/time value to the prepaid account. SCP 204 reacts with SDP 206 to retrieve data necessary for a PPS call and sends reports to SDP 206 for updating data and for statistical purposes. All PPS related subscriber identifiers may be stored in SDP 206. HLR 102 stores all PPS subscriptions just like ordinary subscriptions. Further, HLR 102 may be used for barring terminating calls to a PPS account. PPS subscriptions associated with voice mail addresses are also stored. SCP 206 checks the MS 106 subscriber's account for an associated voice mail number when the subscriber number is busy or disconnected.

Figure 3:
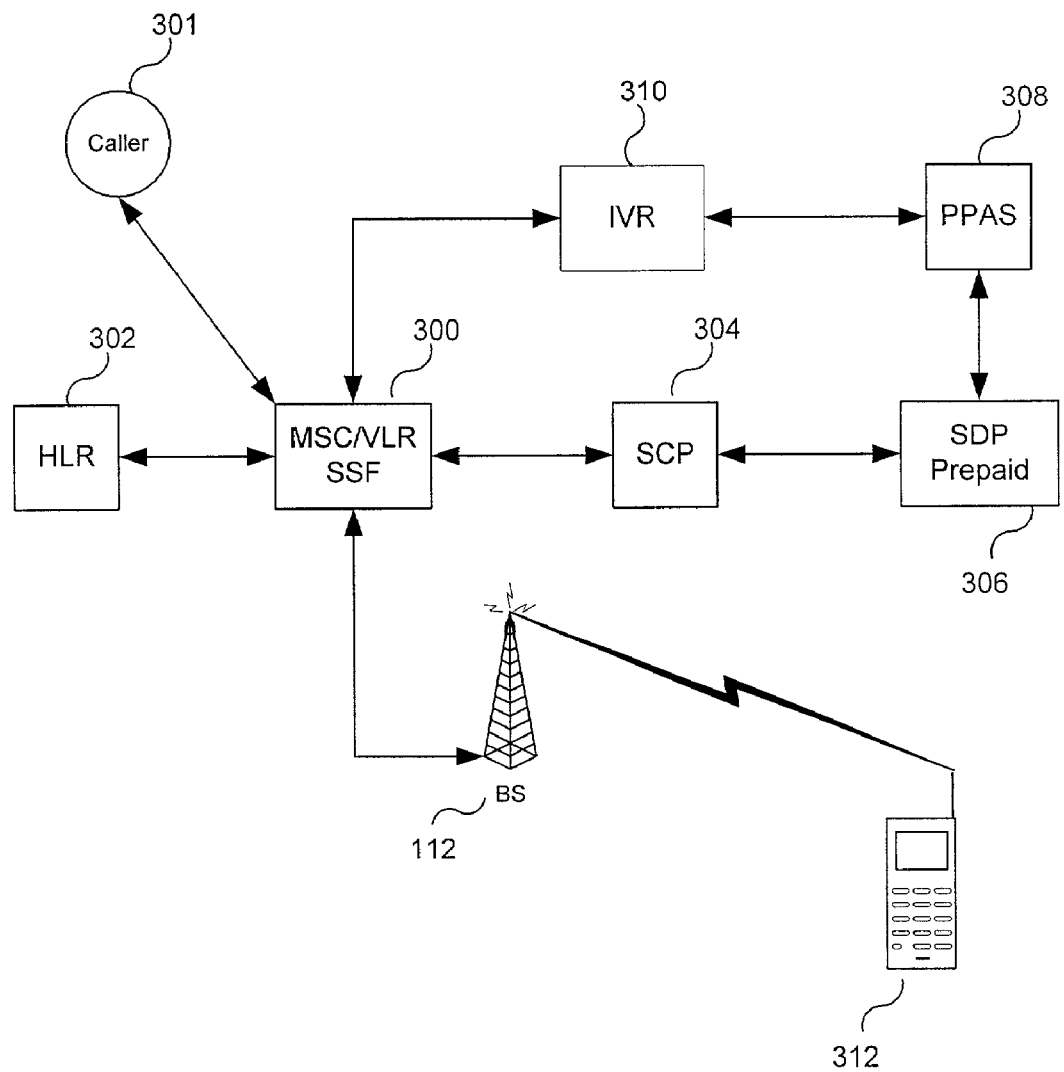
FIG. 3 illustrates a high-level block diagram of a wireless telecommunications system for receiving a voice mail message according to an embodiment of the present invention.

Referring now to FIG. 3, a high-level block diagram of a wireless telecommunications system for receiving a voice mail message is illustrated according to an embodiment of the present invention. Caller 301 dials the number of mobile PPS subscriber 312 and the call is received into MSC/VLR-SSF 300 (hereinafter MSC 300). Subscriber 312 is not available (switched off or busy) and the call is redirected, potentially, to a voice mail number. Because the call is redirected from the subscriber, the system sees this as an "originating" call from the subscriber 312 and originating prepaid service is invoked. Standard PPS actions take place, including monitoring the call for a charge/nocharge indicator.

An interrogation signal is made by MSC 300 to HLR 302. Data containing voice mail information (whether the subscriber has an associated voice mail number) is sent from HLR 302 to the Service Switching Function (SSF) illustrated as part of MSC 300. The SSF determines that this is an outside call forwarded from the prepaid system and SCP 304 is signaled to trigger the no-charge voice mail ("VoiceMailFree") service. Trigger information sent to SCP 304 contains Called Party Number (CPN) (default voice mail number), Redirecting Party Identity (RPId) (PPS subscriber number) and the Calling Party Number (CgPN) (caller number).

SCP 304 checks trigger information with SDP 306 to determine if the call should be charged to the subscriber. SDP 306 checks the PPS subscriber account attributes and determines the tariff scheme to initiate. PPAS 308 receives the call information for account administration purposes and signals Interactive Voice Response system (IVR) to provide any information related to the subscriber account. If SCP 304 determines that the signal's CPN trigger (subscriber number) is not listed as having an associated voice mail number, control is then passed back to SSF and service execution ceases (account charging is initiated).

The CgPN is also compared to the RPId to determine if the subscriber is calling to retrieve voice mail. If the CgPN is different from the RPId and the CPN is on the list of associated voice mail numbers, the SSF is then instructed to set the Charge/noCharge indicator to noCharge. The MSC 300 is then signaled to connect the call to the appropriate voice mail number prior to terminating the service. The noCharge value is reported to PPAS 308, which then informs SDP 306 not to record charges for this call.

In the case where subscriber 312 dials his own number to check for voice mail messages, the number is obviously busy and the call is set to be forwarded to subscriber 312's voice mail number. Again the system perceives the call as originating from subscriber 312 and so originating prepaid service is invoked. Normal prepaid service actions take place, as stated above, including monitoring the charge/NoCharge indicator. MSC 300 receives the forwarded call from the prepaid service which initiates the invocation of the VoiceMailFree service. SCP 304 receives the trigger information; CPN, RPId and CgPN from MSC 300. If RPId and CgPN are the same (the redirecting party is the same as the calling party) control is passed back to SCP 304 and service execution ceases. In other words, when RPId and CgPN are the same, this indicates that subscriber 312 called his/her own number to check for voice mail messages. The charge value of the Charge/noCharge indicator will be reported to SDP 306 and appropriate charges are then applied to subscriber 312's account.

Figure 4:
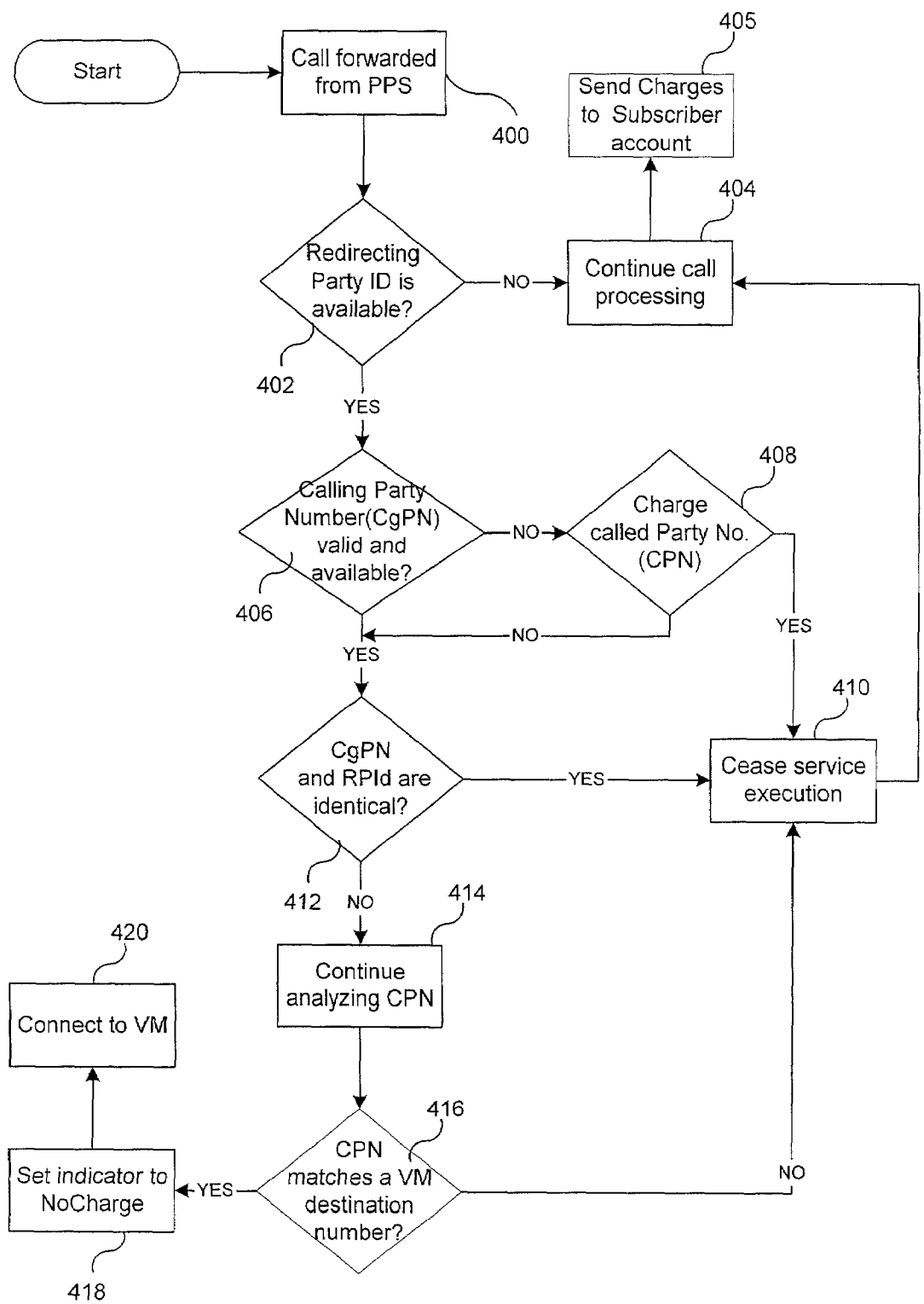
FIG. 4 depicts a method for receiving voice mail, without charge, in a prepaid wireless system, according to an embodiment of the present invention.

FIG. 4 illustrates a method for receiving voice mail, without charge, in a prepaid wireless system, according to an embodiment of the present invention. The method of the present invention, VoiceMailFree service, is an intelligent network service residing in the SCP that is used to determine if calls from the prepaid service system to a voice mail address should be charged. The process begins with a call being received by the service control point that is associated with a prepaid subscriber. If the prepaid subscriber is receiving the call, the act of forwarding the call to the voice mail number invokes the no charge voice mail service of the present invention (process step 400).

Trigger information sent to the SCP contains the Called Party Number (default voice mail destination), the Redirecting Party Identity (PPS subscriber number) and the Calling Party Number (caller number).

The VoiceMailFree service checks the trigger information to determine whether the Redirecting Party Identity (RPId) trigger is available (process step 402). If not, the VoiceMailFree service execution will cease and the service switching function (SSF) will be instructed to continue call processing (process step 404). The charges will then be applied to the prepaid subscriber's account (process step 405).

If the VoiceMailFree service determines that the RPId is available, the process continues processing the incoming call by determining whether the Calling Party Number (CgPN) is present and valid (process step 406). If the CgPN is not available then a service provider switch determines whether the call should be charged to the called party number (CPN) (the subscriber) (process step 408).

If it is determined that the call should be charged to the CPN, VoiceMailFree service execution will cease (process step 410) and the SSF will be instructed to continue call processing, that is the CPN will be charged with the call (process steps 404 and 405). If the call should not be charged to the Called Party Number, VoiceMailFree service execution continues to analyze the trigger information in process step 412.

If the Calling Party Number is available and valid then it is compared to the Redirecting Party Identity (RPId) (process step 412). If the two numbers are identical, i.e. a message retrieval call from the prepaid subscriber handset, then the VoiceMailFree service execution will cease (process step 410) and the SSF will be instructed to continue call processing (process steps 404 and 405). If the CgPN and RPId are different, i.e. an incoming message deposit call (not a call from the subscriber), then VoiceMailFree service execution continues with analyzing the trigger information by checking the Called Party Number (process step 414).

The Called Party Number is then screened against a list of voice mail destination numbers to determine if the prepaid subscriber has a voice mail box number (process step 416). If there is a match then the SCP instructs the SSF to set the chargeNoCharge indicator to noCharge (process step 418) and the VoiceMailFree service connects the call to the voice mail number prior to service termination. The incoming call leaves a voice mail message then disconnects and the SSF terminates the service (process step 420). If the Called Party Number is not on the list of voice mail numbers then the VoiceMailFree service execution will cease (process step 410) and the SSF will be instructed to continue call processing, i.e., the prepaid service function determines and applies the charges applicable to the subscriber account (process step 404 and 405).

In summary, the present invention provides a method that enables a voice mail message to be received at no charge to a prepaid subscriber. A list of voice mail numbers assigned to prepaid subscribers is provided in a database against which the VoiceMailFree service compares PPS calls that are routed to voice mail. The VoiceMailFree service checks a trigger message that contains identifiers including the calling party number, the redirecting party ID and the called party number. The VoiceMailFree service compares the identifiers to determine whether or not to debit (charge) the call charges to the prepaid subscriber account. The VoiceMailFree service determines whether or not the call is forwarded from a failed attempt to connect to the prepaid subscriber or if the prepaid subscriber is checking voice mail. If the call is initiated by the prepaid subscriber, i.e., the subscriber is checking voice mail, the associated prepaid account is debited for the time used. If the call is an incoming call to the prepaid subscriber number that is forwarded to the voice mail number, the associated prepaid account is not debited.

The described method provides a system that will allow a prepaid subscriber to receive voice mail without charge. The subscriber is charged only when the subscriber retrieves voice mail utilizing the subscriber's cell phone. Even though the described embodiment describes the present invention in a particular wireless communications system, it will be obvious to those skilled in the art that the same principles and novelty may be applied to other prepaid cellular systems.

Although preferred embodiment(s) of the methods, systems, and arrangements of the present invention have been illustrated in the accompanying Drawings and described in the foregoing Detailed Description, it will be understood that the present invention is not limited to the embodiment(s) disclosed. Although aspects of the present invention have been described with respect to specific "method steps," those skilled in the art will appreciate from the foregoing description that the present invention may also be embodied as a computer program product for use with a computer system.

Those skilled in the art should readily appreciate that computer programs defining the functions of the present invention can be delivered via a variety of electronic media, which include without limitation: (a) information permanently stored on non-writable storage media (e.g., CD-ROM); (b) information alterably stored on writable storage media (floppy diskettes, hard disk drives, or computer memory); and (c) information conveyed to a computer through a communication medium, such as a computer or communications network. The present invention is capable of numerous rearrangements, modifications, and substitutions without departing from the spirit and scope of the present invention as set forth and defined by the following claims.

What is claimed is:

1. A method for servicing a prepaid subscriber account in a wireless telecommunication system comprising the steps of:
   receiving an incoming call to a prepaid subscriber number;
   determining whether said incoming call originates with said prepaid subscriber number;
   charging said prepaid subscriber account if said incoming call is from said prepaid subscriber number; and
   forgoing said charge to said prepaid subscriber account if said incoming call is not from said prepaid subscriber number.

2. The method as set forth in claim 1, further comprising the steps of:
   redirecting said incoming call to a voice mail number associated with said prepaid subscriber number;
   detecting a trigger attached to said incoming call; and
   determining the number and association of identifiers that are present in said trigger.

3. The method as set forth in claim 1, further comprising the step of:
   responsive to determining the number and association of said identifiers included in said trigger, determining whether at least one said identifier is a called party number (CPN) associated with said prepaid subscriber; and
   determining whether said called party number matches said voice mail number associated with said prepaid subscriber.

4. The method as set forth in claim 1 further comprising the steps of:
   determining whether a redirecting party identifier (RPId) is present in said trigger; and
   comparing said RPId to said CPN.

5. The method as set forth in claim 4 further comprising the step of:
   determining whether said RPId and said CPN are identical.

6. The method as set forth in claim 5, further comprising the step of:
   responsive to a determination that said RPId and said CPN are not identical, setting a charge/nocharge indicator to nocharge value.

7. The method as set forth in claim 6, further comprising the step of:
   responsive to a determination that said RPId and said CPN are identical, setting said charge/no charge indicator to charge value.

8. A system for servicing a prepaid subscriber account in a wireless telecommunication system, comprising:
   receiving communication means for receiving an incoming call to a prepaid subscriber number;
   detecting means for determining whether said incoming call originates with from said prepaid subscriber number;
   means for charging said prepaid subscriber account if said incoming call is from said prepaid subscriber number; and
   means for forgoing said charge to said prepaid subscriber account if said incoming call is not from said prepaid subscriber number.

9. The system as set forth in claim 8, further comprising:
   redirection means for redirecting said incoming call to a voice mail number associated with said prepaid subscriber number;
   detection means for detecting a trigger attached to said incoming call; and
   means for determining the number and association of identifiers that are present in said trigger.

10. The system as set forth in claim 9, further comprising:
    responsive to determining the number and association of said identifiers included in said trigger;
    means for determining whether at least one identifier is a called party number (CPN) associated with said prepaid subscriber; and
    comparison means for determining whether said CPN matches said voice mail number associated with said prepaid subscriber.

11. The system as set forth in claim 8, further comprising:
    detection means for determining whether a redirecting party identifier (RPId) is present in said trigger; and
    means for comparing said RPId to said CPN.

12. The system as set forth in claim 11, further comprising:
    comparison means for determining whether said RPId and said CPN are identical.

13. The system as set forth in claim 12, further comprising:
    responsive to a determination that said RPId and said CPN are not identical, means for setting a charge/no charge indicator to no charge value, wherein said indicator is capable of indicating one of said charge value and said no charge value.

14. The system as set forth in claim 12, further comprising:
  responsive to a determination that said RPId and said CPN are identical, means for setting said indicator to said charge value.

15. A computer program product for use with a data processing system for servicing a prepaid subscriber in a wireless telecommunication system, the computer program product comprising:
  instructions within said computer program product for receiving an incoming call to a prepaid subscriber number;
  instructions within said computer program product for determining whether said incoming call originates with said prepaid subscriber;
  instructions within said computer program product for charging said prepaid subscriber account if said incoming call is from said prepaid subscriber; and
  instructions within said computer program product for forgoing said charge to said prepaid subscriber account if said incoming call is not from said prepaid subscriber number.

16. The computer program product as set forth in claim 15, further comprising:
  instructions within said computer program product for redirecting said incoming call to a voice mail number associated with said prepaid subscriber;
  instructions within said computer program product for detecting a trigger attached to said incoming call; and
  instructions within said computer program product for determining the number and association of identifiers that are present in said trigger.

17. The computer program product as set forth in claim 15, further comprising:
  responsive to determining the number and association of said identifiers included in said trigger, instructions within said computer program product for determining whether one of said identifiers is a called party number (CPN) associated with said prepaid subscriber; and
  instructions within said computer program product for determining whether said called party number matches said voice mail destination number associated with said prepaid subscriber.

18. The computer program product as set forth in claim 15, further comprising:
  instructions within said computer program product for determining whether a redirecting party identifier (RPId) is present in said trigger; and
  instructions within said computer program product for comparing said RPId to said CPN.

19. The computer program product as set forth in claim 18 further comprising:
  instructions within said computer program product for determining whether said RPId and said CPN are identical.

20. The computer program product as set forth in claim 19, further comprising:
  responsive to a determination that said RPI and said CPN are not identical, instructions within said computer program product for setting a charge/no charge indicator to no charge value wherein said indicator is capable of indicating one of no charge value and charge value.

21. The computer program product as set forth in claim 19, further comprising:
  responsive to a determination that said RPId and said CPN are identical, instructions within said computer program product for setting said indicator to said charge value.

* * * * *